UNITED STATES PATENT OFFICE.

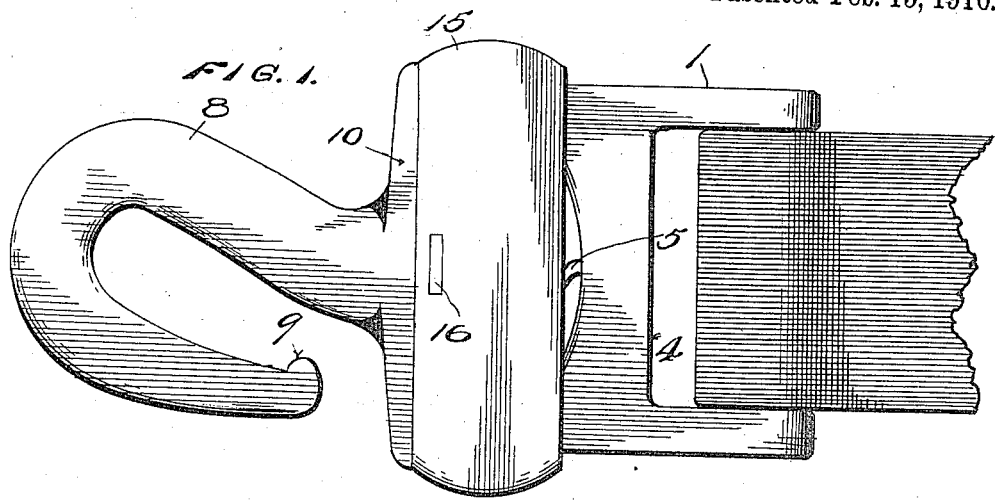
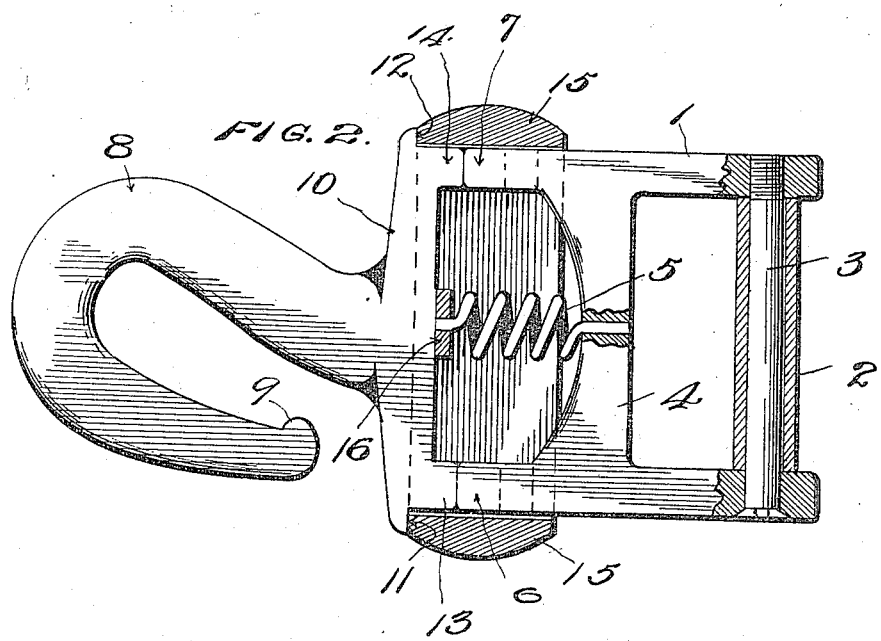
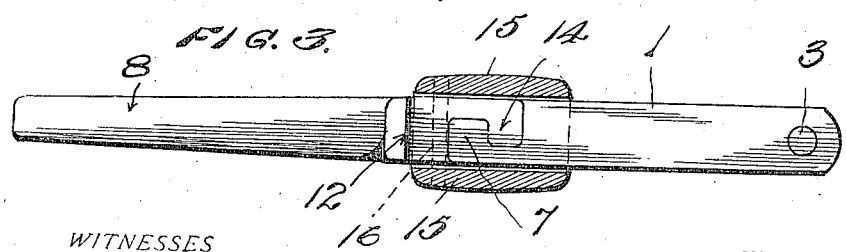

OSCAR AIKINS, OF LOGUE, PENNSYLVANIA.

HOOK.

949,014.  Specification of Letters Patent.  Patented Feb. 15, 1910.

Application filed March 5, 1909. Serial No. 481,317.

*To all whom it may concern:*

Be it known that I, OSCAR AIKINS, a citizen of the United States, residing at Logue, in the county of Potter and State of Pennsylvania, have invented certain new and useful Improvements in Hooks, of which the following is a specification.

This invention relates to improvements in hooks, which, while designed primarily for use with harness, would be useful for other purposes where hooks are employed.

The chief object of my invention is to produce a separable hook, which can be instantly separated, so that the hook member may be disconnected from the body portion thereof, which is secured to a trace or other member.

Other objects and advantages of my invention will be evident from the following specification.

In the accompanying drawings: Figure 1 is a side elevation of my improved hook; Fig. 2 is a side elevation partly in section; and Fig. 3 is a side elevation, partly in section, taken at right angles to Figs. 1 and 2.

Referring to the drawing, which illustrates the preferred form of my invention, 1 designates the lower or body portion of my hook, which is H-shaped, and has the ends of its lower legs connected together by a tubular sleeve 2, which is held in position by a bolt 3 passing therethrough. This sleeve 2 serves as the part to which the end of the trace or other member is attached, as shown in Fig. 1. The center connecting bar 4 of the H-shaped member has fixed thereon one end of a spiral spring 5 for a purpose to be explained later. The upper legs of the H-shaped member are cut away to remove a portion thereof, and the resulting projections at the ends of the legs are cut away to form hooks or engaging members 6 and 7.

Adapted for association with the H-shaped portion is a hook member 8 provided with a shoulder portion 10 which is cut away at each end to form projections or overhangs 11 or 12. The shoulder portion 10 is also undercut so as to form short legs, which are in turn cut away in the same manner as the upper legs of the H-shaped member 1 to form hooks or engaging members 13 and 14, which are duplicates of hooks 6 and 7. These hooks or engaging members are indicated in full and dotted lines in Fig. 2, and in full lines in Fig. 3.

As shown, the hook member 8 has a projection 9 formed at its inner end to prevent it from becoming accidentally unhooked.

The hooks 6 and 7 of the H-shaped member and 13 and 14 of the hook member 8 are adapted to interhook or engage, as illustrated. These interhooked or engaged parts are normally held in such position by means of a keeper or band 15 provided with a cross piece 16 to which the top of the spiral spring 5 is attached, and this spring forces the keeper against the projections 11 and 12 thereby covering the engaged parts and preventing them from becoming unhooked or disengaged. When it is desired to separate the hook member and the H-shaped member all that it is necessary to do is to depress the keeper 15 until the engaged parts are uncovered, and then the parts can be immediately separated.

The great value of my hook is demonstrated in an emergency, when it becomes imperative to unhook instantly. As the hook is generally under stress this is almost impossible with the ordinary hook, but with my improved hook all that is necessary to do is to simply depress the keeper 15 against the tension of the spring 5 until it clears the engaged hooks of the hook member and the H-shaped body portion, and then the parts can be immediately separated. In cases, for example, of a runaway or fallen horse, where my hooks are employed to connect the traces to the whiffletree, the horse could be immediately freed by separating the hooks as described.

Having described my invention, what I claim is,

1. A hook, comprising an interlocking body member and hook member, said hook member being provided with a flange, said body member being provided with an opening, a sleeve slidably mounted upon said body member for retaining said hook member and said body member in locked engagement, a spring arranged longitudinally of said body member within said opening for normally retaining said sleeve against said flange of said hook member.

2. A hook, comprising an interlocking body member and hook member, said hook member being provided with a flange, a sleeve longitudinally slidably mounted upon said body member for retaining said hook member and said body member in locked engagement, an elastic member arranged upon said body member and adapted to yieldingly limit the longitudinal movement of said sleeve and to retain said sleeve in contact with said flange.

In testimony whereof I affix my signature in presence of two witnesses.

OSCAR AIKINS.

Witnesses:
E. ALTON EARLE,
W. H. FABER.